Patented Aug. 10, 1943

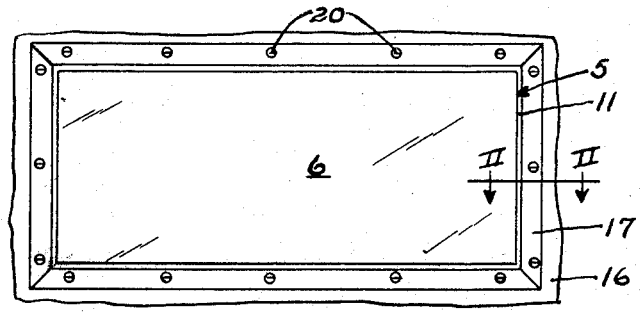
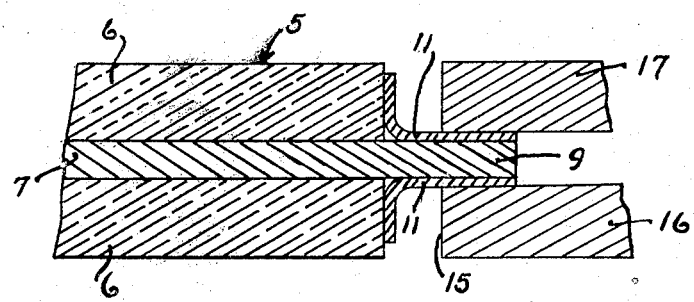
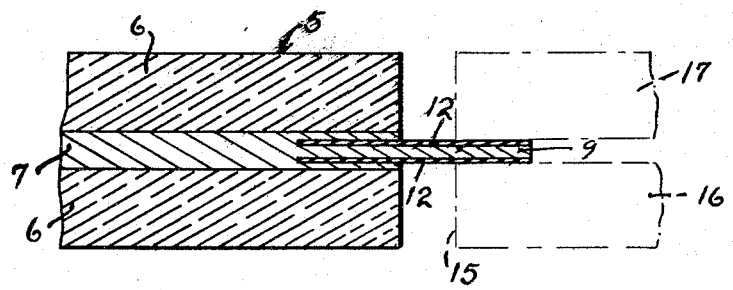
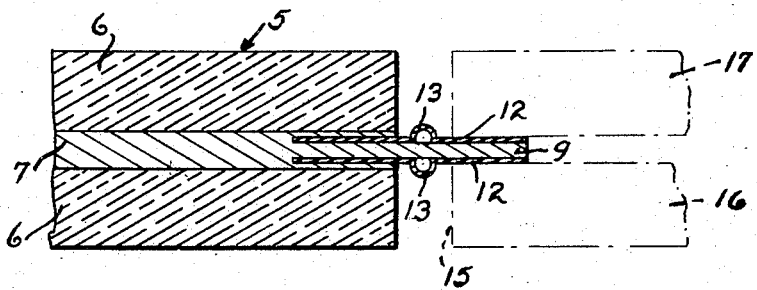

2,326,203

UNITED STATES PATENT OFFICE 2,326,203

LAMINATED GLAZING PANEL

Brook J. Dennison, Aspinwall, Pa., assignor to Pittsburgh Plate Glass Company, Allegheny County, Pa., a corporation of Pennsylvania Application January 21, 1941, Serial No. 375,121

4 Claims. (Cl. 20—56)

The present invention relates to transparent closures and more particularly to a laminated glazing panel containing an integral plastic border, which serves as a mounting means.

One object of the invention is the provision of a laminated glazing panel having a plastic border which exhibits increased resistance to weathering and thereby has a prolonged serviceable life.

A second object of the invention is the provision of a reinforced plastic border for a laminated glazing panel which forms a permanent part of the assembly.

Other objects and advantages of the invention will become more apparent from the following detailed description of certain preferred embodiments thereof.

There has recently been developed a laminated glass in which the reinforcing interlayer material projects beyond the edges of the glass laminae to form a border. The laminated plates are supported in a suitable frame solely through this border and the disadvantages incident to the frame structure overlapping the glass itself have been substantially eliminated. This structure is particularly desirable in connection with installations where considerable variations in pressures on opposite sides of the panel will be experienced, for example, in substratosphere airplanes. Herein the glazing panels will have a reasonable latitude of movement, whereas, if the supporting frame overlapped the glass laminae, excessive stresses would be set up in the glass, resulting in failure thereof.

In order that the plastic borders of the laminated plates will be stronger and more serviceable, various types of reinforcing materials have been included therein. The exposed portions of the border between the edges of the glass laminae and the frame have been covered by resilient material, such as a plastic caulking compound. It has been observed, however, that moisture will penetrate the seal and destroy the strength of the exposed plastic.

Briefly stated, the present invention contemplates the addition of a shielding material to the exposed areas of the plastic border, in order to prolong the effective life thereof.

In the drawing

Figure 1 is a plan view of a glazed structure embodying a laminated panel as contemplated by my invention;

Figure 2 is a fragmentary vertical sectional view thereof, taken substantially along the line II—II of Fig. 1;

Figure 3 is a fragmentary vertical sectional view of another form of the invention; and Figure 4 is a fragmentary vertical sectional view of still another form of the invention.

Referring to the drawing, a laminated glazing panel 5 comprises a plurality of glass plates 6, united by a plastic reinforcing material 7. The plastic material projects beyond the edges of the glass plates to form a border 9. Layers 11 of flexible metal foil cover the plastic border 9 and are adhered thereto and to the edges of the glass plates by any suitable adhesive. The laminated plate 5 is supported in an opening 15, which is of greater dimensions than the panel 5, in a wall structure 16, by means of a frame 17, engaging the border 9 of the panel. A plurality of bolts 20, or other fastening devices secure the frame 17 to the wall 16. These bolts 20 may pass through the border 9, although a sufficient clamping action can be obtained otherwise.

As shown in Figure 3, the exposed plastic border 9 may be shielded by coating layers of flexible metal foil, which are also embedded in the plastic material lying between the glass plates. In this connection the layers of metal foil are incorporated in the panel while the several elements thereof are being assembled and are made an integral part of the panel during the laminating operation.

Inasmuch as the plastic border will be subject to considerable flexing and stretching, when in service, the compensating portions 13 (Fig. 4) may be provided in the layers 12 of metal foil intermediate the edge of the plastic border 9, and the edges of the plates 6. These compensating portions 13, which are relatively small bulges in the metal foil covering layers, are not adhered to the plastic border, and accordingly as that border is stretched they will permit free movement without rupture of the foil layer or destruction of the adhesion between the foil and the border.

Any of the plastic reinforcing materials commonly employed in the manufacture of laminated glass may be used to unite the glass plates 6. If it is desired, additional reinforcing means may be included in the plastic material to strengthen the projecting border 9. The shielding for the projecting border is preferably a continuous metal foil of aluminum, lead or copper. The foil should be relatively thin in order that it will not impair flexibility of the mounted panel.

It will at once be obvious that various modifications in the nature of the several elements of my invention and their arrangements are possible without departing from the spirit of the invention or the scope of the appended claims.

What I claim is:

1. A laminated glazing panel comprising a plurality of glass plates united by a plastic reinforcing material, a border of the plastic material projecting beyond the edges of the glass plates, and layers of flexible metal foil adhered to the plastic border and the edges of the glass plates.

2. A laminated glazing panel comprising a plurality of glass plates united by a plastic reinforcing material, a border of the plastic material projecting beyond the edges of the glass plates, and layers of flexible metal foil adhered to opposite sides of the plastic border and having compensating portions therein to compensate for flexing thereof, the inner borders of said foil being embedded in the plastic material between the glass plates.

3. A laminated glazing panel comprising a plurality of glass plates united by a plastic reinforcing material, a border of the plastic material projecting beyond the edges of the glass plates, and layers of flexible metal foil having compensating portions therein adhered to the plastic border and the edges of the glass plates.

4. In a glazing structure, a flexible interlayer of organic plastic, glass plates bonded upon opposite sides of the interlayer to form a laminated unit, said interlayer having flexible marginal portions extending beyond the edges of the glass, and flexible metal foil bonded upon opposite sides of the extended marginal portions of the interlayer and to the body portion of the laminated unit to cover opposite sides of the portions of the interlayer projecting beyond the edges of the glass plates.

BROOK J. DENNISON.